US010356785B2

(12) United States Patent
Martin et al.

(10) Patent No.: US 10,356,785 B2
(45) Date of Patent: *Jul. 16, 2019

(54) TELECOMMUNICATIONS APPARATUS AND METHODS

(71) Applicant: SONY CORPORATION, Tokyo (JP)

(72) Inventors: Brian Alexander Martin, Basingstoke (GB); Yuichi Morioka, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/140,143

(22) Filed: Sep. 24, 2018

(65) Prior Publication Data

US 2019/0029021 A1 Jan. 24, 2019

Related U.S. Application Data

(63) Continuation of application No. 15/785,847, filed on Oct. 17, 2017, now Pat. No. 10,104,668, which is a (Continued)

(30) Foreign Application Priority Data

Aug. 16, 2013 (EP) ..................................... 13180723

(51) Int. Cl.
*H04W 4/70* (2018.01)
*H04W 8/20* (2009.01)
(Continued)

(52) U.S. Cl.
CPC ......... *H04W 72/0453* (2013.01); *H04W 8/20* (2013.01); *H04W 72/042* (2013.01);
(Continued)

(58) Field of Classification Search
CPC . H04W 72/0453; H04W 8/20; H04W 72/042; H04W 72/0413; H04W 4/005; H04W 74/06
See application file for complete search history.

(56) References Cited

U.S. PATENT DOCUMENTS

| 8,345,604 B2 | 1/2013 | Balasubramanian |
| 9,042,326 B2 | 5/2015 | Lim |

(Continued)

FOREIGN PATENT DOCUMENTS

| CN | 101568103 | 10/2009 |
| EP | 1950991 | 7/2008 |

(Continued)

OTHER PUBLICATIONS

International Search Report dated Aug. 21, 2014 in PCT/EP2014/060198.

(Continued)

*Primary Examiner* — Brian T O Connor
(74) *Attorney, Agent, or Firm* — Xsensus LLP

(57) ABSTRACT

A wireless telecommunications system in which downlink communications are made using a radio interface that spans a system frequency bandwidth (host carrier) and supports at least some communications from a base station to least some terminal devices within a plurality of restricted frequency bands (virtual carriers) which are narrower than and within the system frequency bandwidth. A terminal device conveys an indication of its identity, to the base station during an initial connection procedure as the terminal device seeks to access the radio interface. The terminal device and the base station both determine a selected restricted frequency band from among the plurality of restricted frequency bands based on the identity of the terminal device in the same way. Thus the terminal device and base station select the same restricted frequency band and can accordingly configure (Continued)

their respective transceivers to allow downlink communications between them within the selected restricted frequency band.

17 Claims, 6 Drawing Sheets

Related U.S. Application Data continuation of application No. 14/909,511, filed as application No. PCT/EP2014/060198 on May 19, 2014, now Pat. No. 9,820,279.

(51) Int. Cl.
    *H04W 72/04* (2009.01)
    *H04W 74/06* (2009.01)

(52) U.S. Cl.
    CPC .......... *H04W 4/70* (2018.02); *H04W 72/0413* (2013.01); *H04W 74/06* (2013.01)

(56) References Cited

U.S. PATENT DOCUMENTS

| | | | |
|---|---|---|---|
| 9,077,433 B2 | 7/2015 | Yamada | |
| 9,516,450 B2 | 12/2016 | Beale | |
| 9,572,147 B2 | 2/2017 | Beale | |
| 9,820,279 B2 * | 11/2017 | Martin | H04W 72/0453 |
| 9,918,315 B2 * | 3/2018 | Martin | H04W 76/10 |
| 10,104,668 B2 * | 10/2018 | Martin | H04W 72/0453 |
| 10,117,180 B2 * | 10/2018 | Martin | H04W 52/0212 |
| 2009/0010213 A1 | 1/2009 | Yamada et al. | |
| 2009/0190534 A1 | 7/2009 | Yamada et al. | |
| 2009/0258647 A1 | 10/2009 | Yamada et al. | |
| 2013/0089061 A1 | 4/2013 | Lim et al. | |
| 2014/0119315 A1 | 5/2014 | Darwood | |
| 2014/0307697 A1 | 10/2014 | Beale | |
| 2014/0307698 A1 | 10/2014 | Beale | |
| 2015/0208389 A1 | 7/2015 | Imamura | |
| 2015/0237459 A1 | 8/2015 | Webb et al. | |
| 2016/0157232 A1 | 6/2016 | Martin et al. | |
| 2016/0205691 A1 | 7/2016 | Darwood | |

FOREIGN PATENT DOCUMENTS

| | | |
|---|---|---|
| GB | 2487757 | 8/2012 |
| GB | 2487780 | 8/2012 |
| GB | 2487782 | 8/2012 |
| GB | 2487906 | 8/2012 |
| GB | 2487907 | 8/2012 |
| GB | 2487908 | 8/2012 |
| GB | 2487909 | 8/2012 |
| GB | 2488513 | 9/2012 |
| GB | 2493703 | 2/2013 |
| GB | 2497742 | 6/2013 |
| GB | 2497743 | 6/2013 |
| JP | 2009-542091 | 11/2009 |
| JP | 2012-169728 | 9/2012 |
| JP | 2014-506085 A | 3/2014 |
| JP | 2015-506160 A | 2/2015 |
| WO | 2007/040201 | 4/2007 |
| WO | 2012/104633 | 8/2012 |
| WO | 2013/093437 | 6/2013 |
| WO | 2014/027851 | 2/2014 |
| WO | 2014/087145 | 6/2014 |

OTHER PUBLICATIONS

"Digital cellular telecommunications system (Phase 2+);Universal Mobile Telecommunications System (UMTS): LTE; Service requirements for Machine-Type Communications (MTC) Stage 1" ETSI TS 122 368, V10.5.0, (3GPP TS 22.368 version 10.5.0 Release 10), Jul. 2011, 18 Pages.

Harri Holma, et al., "LTE for UMTS OFDMA and SC-FDMA Based Radio Access" Wiley and Sons, 2009, 4 Pages.

Combined Chinese Office Action and Search Report dated Apr. 11, 2018, in Patent Application No. 201480045084. 9 (with English translation), citing documents AO and AP therein, 19 pages.

Office Action dated Nov. 7, 2017 in Japanese Patent Application No. 2016-533843 (with partial English language translation).

Office Action received for Chinese Patent Application No. 201480045084.9, dated Nov. 12, 2018, 10 pages including English translation.

Japanese Office Action dated Feb. 19, 2019 in Japanese Application No. 2018-091268.

* cited by examiner

TELECOMMUNICATIONS APPARATUS AND METHODS

CROSS-REFERENCE TO RELATED APPLICATIONS

The present application is a continuation of U.S. patent application Ser. No. 15/785,847, filed Oct. 17, 2017, which is a continuation of U.S. patent application Ser. No. 14/909, 511, filed Feb. 2, 2016, which is based on PCT filing PCT/EP2014/060198 filed May 19, 2014, and claims priority to European Patent Application 13 180 723.2, filed in the European Patent Office on Aug. 16, 2013, the entire contents of each of which being incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The present invention relates to wireless telecommunications systems and methods, and in particular to systems and methods for restricted bandwidth/virtual carrier operation in wireless telecommunication systems.

Mobile communication systems have evolved over the past ten years or so from the GSM System (Global System for Mobile communications) to the 3G system and now include packet data communications as well as circuit switched communications. The third generation partnership project (3GPP) is developing a fourth generation mobile communication system referred to as Long Term Evolution (LTE) in which a core network part has been evolved to form a more simplified architecture based on a merging of components of earlier mobile radio network architectures and a radio access interface which is based on Orthogonal Frequency Division Multiplexing (OFDM) on the downlink and Single Carrier Frequency Division Multiple Access (SC-FDMA) on the uplink.

Third and fourth generation mobile telecommunication systems, such as those based on the 3GPP defined UMTS and Long Term Evolution (LTE) architectures, are able to support a more sophisticated range of services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, some of which are in some respects typified by semi-autonomous or autonomous wireless communication devices (MTC devices) communicating small amounts of data on a relatively infrequent basis. Examples include so-called smart meters which, for example, are located in a customers home and periodically transmit data back to a central MTC server relating to the customers consumption of a utility such as gas, water, electricity and so on. Smart metering is merely one example of potential MTC device applications. Further information on characteristics of MTC-type devices can be found, for example, in the corresponding standards, such as ETSI TS 122 368 V10.530 (2011-07)/ 3GPP TS 22.368 version 10.5.0 Release 10) [1].

Whilst it can be convenient for a terminal such as an MTC-type terminal to take advantage of the wide coverage area provided by a third or fourth generation mobile telecommunication network there are at present disadvantages. Unlike a conventional third or fourth generation mobile terminal such as a smartphone, a primary driver for MTC-type terminals will be a desire for such terminals to be relatively simple and inexpensive. The type of functions typically performed by an MTC-type terminal (e.g. simple collection and reporting/reception of relatively small amounts of data) do not require particularly complex processing to perform, for example, compared to a smartphone supporting video streaming. However, third and fourth generation mobile telecommunication networks typically employ advanced data modulation techniques and support wide bandwidth usage on the radio interface which can require more complex and expensive radio transceivers and decoders to implement. It is usually justified to include such complex elements in a smartphone as a smartphone will typically require a powerful processor to perform typical smartphone type functions. However, as indicated above, there is now a desire to use relatively inexpensive and less complex devices which are nonetheless able to communicate using LTE-type networks.

With this in mind there has been proposed a concept of so-called "virtual carriers" operating within the bandwidth of a "host carrier", for example, as described in GB 2 487 906 [2], GB 2 487 908 [3], GB 2 487 780 [4], GB 2 488 513 [5], GB 2 487 757 [6], GB 2 487 909 [7], GB 2 487 907 [8] and GB 2 487 782 [9]. One principle underlying the concept of a virtual carrier is that a frequency subregion within a wider bandwidth host carrier is configured for use as a self-contained carrier for at least some types of communications with certain types of terminal device.

In some implementations, such as described in references [2] to [9], all downlink control signalling and user-plane data for terminal devices using the virtual carrier are conveyed within the frequency subregion. A terminal device operating on the virtual carrier is made aware of the restricted frequency band and need only receive and decode a corresponding subset of transmission resources to receive data from the base station. An advantage of this approach is to provide a carrier for use by low-capability terminal devices capable of operating over only relatively narrow bandwidths. This allows devices to communicate on LTE-type networks, without requiring the devices to support full bandwidth operation. By reducing the bandwidth of the signal that needs to be decoded, the front end processing requirements (e.g., FFT, channel estimation, subframe buffering etc.) of a device configured to operate on a virtual carrier are reduced since the complexity of these functions is generally related to the bandwidth of the signal received.

Other virtual carrier approaches for reducing the required complexity of devices configured to communicate over LTE-type networks are proposed in GB 2 497 743 [10] and GB 2 497 742 [11]. These documents propose schemes for communicating data between a base station and a reduced-capability terminal device whereby physical-layer control information for the reduced-capability terminal device is transmitted from the base station using subcarriers selected from across a full host carrier frequency band (as for conventional LTE terminal devices). However, higher-layer data for reduced-capability terminal devices (e.g. user-plane data) is transmitted using only subcarriers selected from within a restricted frequency band which is smaller than and within the system frequency band. Thus, this is an approach in which user-plane data for a particular terminal device may be restricted to a subset of frequency resources (i.e. a virtual carrier supported within the transmission resources of a host carrier), whereas control signalling is communicated using the full bandwidth of the host carrier. The terminal device is made aware of the restricted frequency band, and as such need only buffer and process data within this restricted frequency band during periods when higher-layer data is being transmitted. The terminal device buffers and processes the full system frequency band during periods when physical-layer control information is being transmitted. Thus, the reduced-capability terminal device may be incorporated in a network in which physical-layer control information is transmitted over a wide frequency range, but only needs to have sufficient memory and processing capacity to process a smaller range of frequencies for the higher-layer data. This approach may sometimes be referred to as a "T-shaped" allocation because area of the downlink time-frequency resource grid to be used by the reduced-capability terminal device typically comprises a generally T-shape.

Virtual carrier concepts thus allow terminal devices having reduced capabilities, for example in terms of their transceiver bandwidth and/or processing power, to be supported within LTE-type networks. As noted above, this can be useful for to allow relatively inexpensive and low complexity devices to communicate using LTE-type networks.

In some situations more than one virtual carrier may be supported in a host carrier. In this case the different virtual carriers are located at different frequencies within the host carrier bandwidth and individual terminal devices are allocated to one of the virtual carriers. This approach can be used to increase the number of terminal devices that can be supported using virtual carrier communications. However, in order to do this, it is necessary for individual terminal devices and the base station establish which frequency particular resources (i.e. which of the plurality of virtual carriers) is to be used by a given terminal device. Typically this requires some level of control signalling to be exchanged between the base station and the respective terminal devices, for example for the base station to inform the terminal device of which virtual carrier it is to be allocated to. This need for terminal device specific control signalling to be exchanged between the base station and the terminal devices gives rise to some drawbacks. For example, there can be an increase in signalling complexity with information being exchanged in dedicated signalling during connection establishment, and more generally, it gives rise to an increase in control signalling overhead in the telecommunications system, particularly in the case where there are a high number of devices in a cell.

Accordingly, there is a desire for approaches for allocating specific terminal devices to specific virtual carriers in wireless telecommunications systems.

SUMMARY

According to a first aspect of the present disclosure, there is provided a method of operating a terminal device in a wireless telecommunications system in which downlink communications are made by a base station using a radio interface that spans a system frequency bandwidth (host carrier) and supports at least some communications with at least some terminal devices within a plurality of restricted frequency bands (virtual carriers) which are narrower than and within the system frequency bandwidth, the method comprising: selecting a restricted frequency band from among the plurality of restricted frequency bands based on an identifier for the terminal device; and configuring the terminal device to receive downlink communications from the base station within the selected restricted frequency band.

According to a second aspect of the present disclosure, there is provided a terminal device for use in a wireless telecommunications system in which downlink communications are made by a base station using a radio interface that spans a system frequency bandwidth and supports at least some communications with at least some terminal devices within a plurality of restricted frequency bands which are narrower than and within the system frequency bandwidth, the terminal device comprising a processor unit and a transceiver unit, and wherein the processor unit is configured to select a restricted frequency band from among the plurality of restricted frequency bands based on an identifier for the terminal device and to configure the transceiver unit to receive downlink communications from the base station within the selected restricted frequency band.

According to a third aspect of the present disclosure, there is provided a method of operating a base station in a wireless telecommunications system in which downlink communications are made by the base station using a radio interface that spans a system frequency bandwidth and supports at least some communications with at least some terminal devices within a plurality of restricted frequency bands which are narrower than and within the system frequency bandwidth, the method comprising: selecting a restricted frequency band to be used for downlink communications for a terminal device from among the plurality of restricted frequency bands based on an identifier for the terminal device; and transmitting downlink communications to the terminal device within the selected restricted frequency band.

According to a fourth aspect of the present disclosure, there is provided a base station for use in a wireless telecommunications system in which downlink communications are made by the base station using a radio interface that spans a system frequency bandwidth and supports at least some communications with at least some terminal devices within a plurality of restricted frequency bands which are narrower than and within the system frequency bandwidth, the base station comprising a processor unit and a transceiver unit, and wherein the processor unit is configured to select a restricted frequency band to be used for downlink communications with a terminal device from among the plurality of restricted frequency bands based on an identifier for the terminal device; and to configure the transceiver unit to transmit downlink communications to the terminal device within the selected restricted frequency band.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
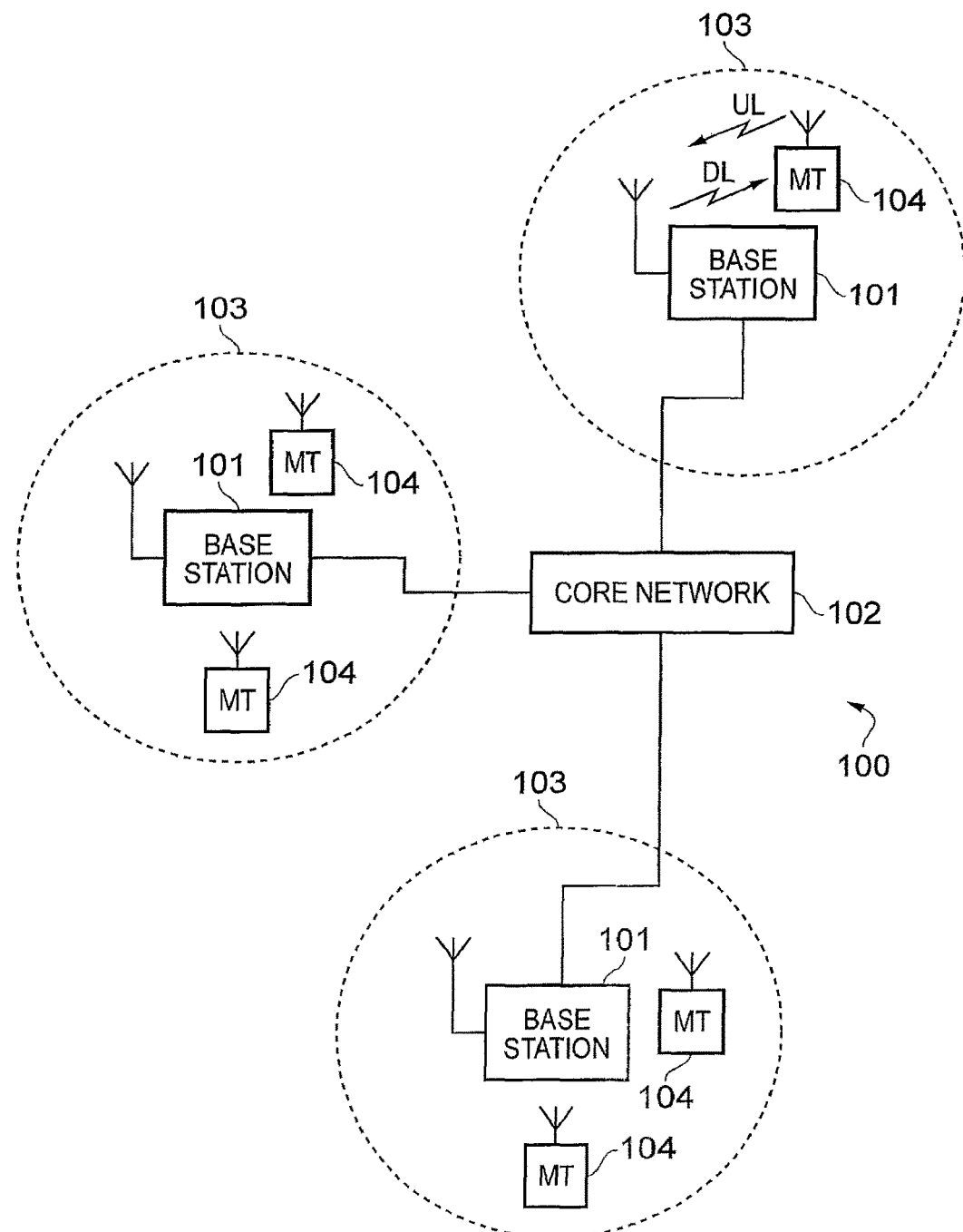
FIG. 1 schematically represents an example of a LTE-type wireless telecommunication network.

FIG. 1 provides a schematic diagram illustrating some basic functionality of a wireless telecommunications network/system 100 operating in accordance with LTE principles. Various elements of FIG. 1 and their respective modes of operation are well-known and defined in the relevant standards administered by the 3GPP (RTM) body and also described in many books on the subject, for example, Holma, H. and Toskala, A. [12].

The network 100 includes a plurality of base stations 101 connected to a core network 102. Each base station provides a coverage area 103 (i.e. a cell) within which data can be communicated to and from terminal devices 104. Data are transmitted from base stations 101 to terminal devices 104 within their respective coverage areas 103 via a radio downlink. Data are transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, and so forth. Base stations may also be referred to as transceiver stations/nodeBs/e-NodeBs, and so forth.

Figure 2:
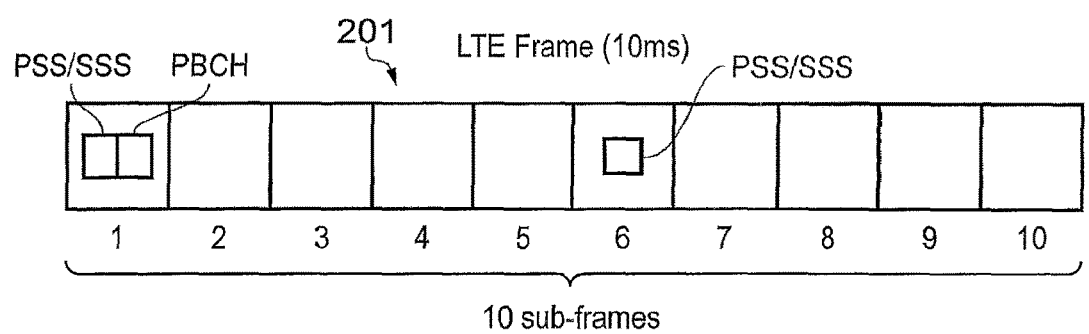
FIG. 2 schematically represents some aspects of a LTE downlink radio frame structure.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and a single carrier frequency division multiplex based interface for the radio uplink (so-called SC-FDMA). FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
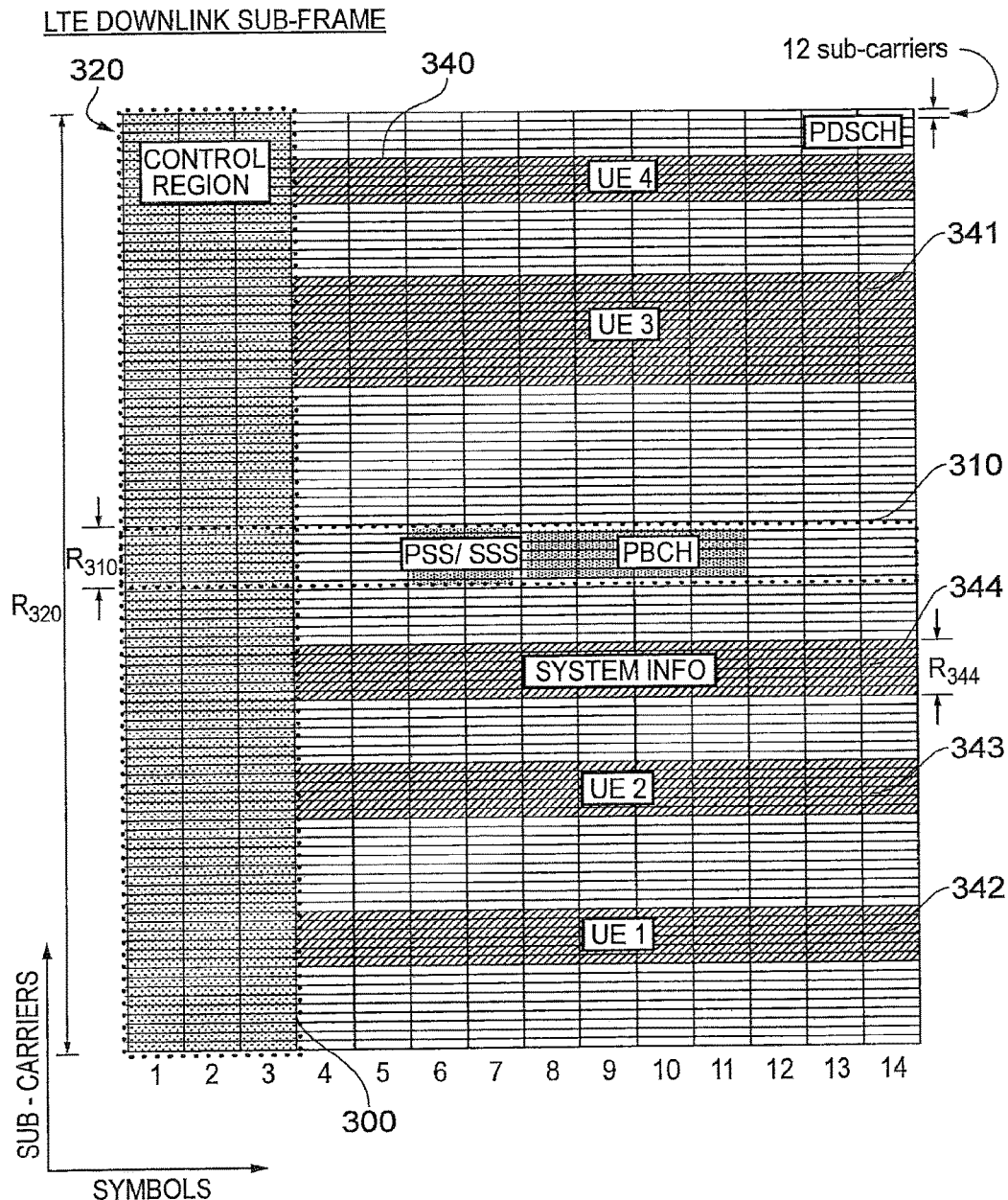
FIG. 3 schematically represents some aspects of a LTE downlink radio subframe structure.

FIG. 3 is a schematic diagram of a grid which illustrates the structure of an example conventional downlink LTE subframe (corresponding in this example to the first, i.e. left-most, subframe in the frame of FIG. 2). The subframe comprises a predetermined number of symbols which are transmitted over a 1 ms period. Each symbol comprises a predetermined number of orthogonal sub-carriers distributed across the bandwidth of the downlink radio carrier.

The example subframe shown in FIG. 3 comprises 14 symbols and 1200 sub-carriers spread across a 20 MHz bandwidth. The smallest allocation of user data for transmission in LTE is a resource block comprising twelve sub-carriers transmitted over one slot (0.5 subframe). For clarity, in FIG. 3, each individual resource element (a resource element comprises a single symbol on a single subcarrier) is not shown, instead each individual box in the subframe grid corresponds to twelve sub-carriers transmitted on one symbol.

FIG. 3 shows resource allocations for four LTE terminals 340, 341, 342, 343. For example, the resource allocation 342 for a first LTE terminal (UE 1) extends over five blocks of twelve sub-carriers (i.e. 60 sub-carriers), the resource allocation 343 for a second LTE terminal (UE2) extends over six blocks of twelve sub-carriers and so on.

Control channel data are transmitted in a control region 300 (indicated by dotted-shading in FIG. 3) of the subframe comprising the first n symbols of the subframe where n can vary between one and three symbols for channel bandwidths of 3 MHz or greater and where n can vary between two and four symbols for channel bandwidths of 1.4 MHz. For the sake of providing a concrete example, the following description relates to carriers with a channel bandwidth of 3 MHz or greater so the maximum value of n will be 3. The data transmitted in the control region 300 includes data transmitted on the physical downlink control channel (PDCCH), the physical control format indicator channel (PCFICH) and the physical HARQ indicator channel (PHICH).

PDCCH contains control data indicating which sub-carriers on which symbols of the subframe have been allocated to specific LTE terminals. Thus, the PDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow an LTE terminal device to achieve frame synchronisation and determine the cell identity of the enhanced Node B transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the subframe.

FIG. 3 also shows a region of PDSCH containing system information and extending over a bandwidth of R344. A conventional LTE frame will also include reference signals which are not shown in FIG. 3 in the interests of clarity.

Figure 4:
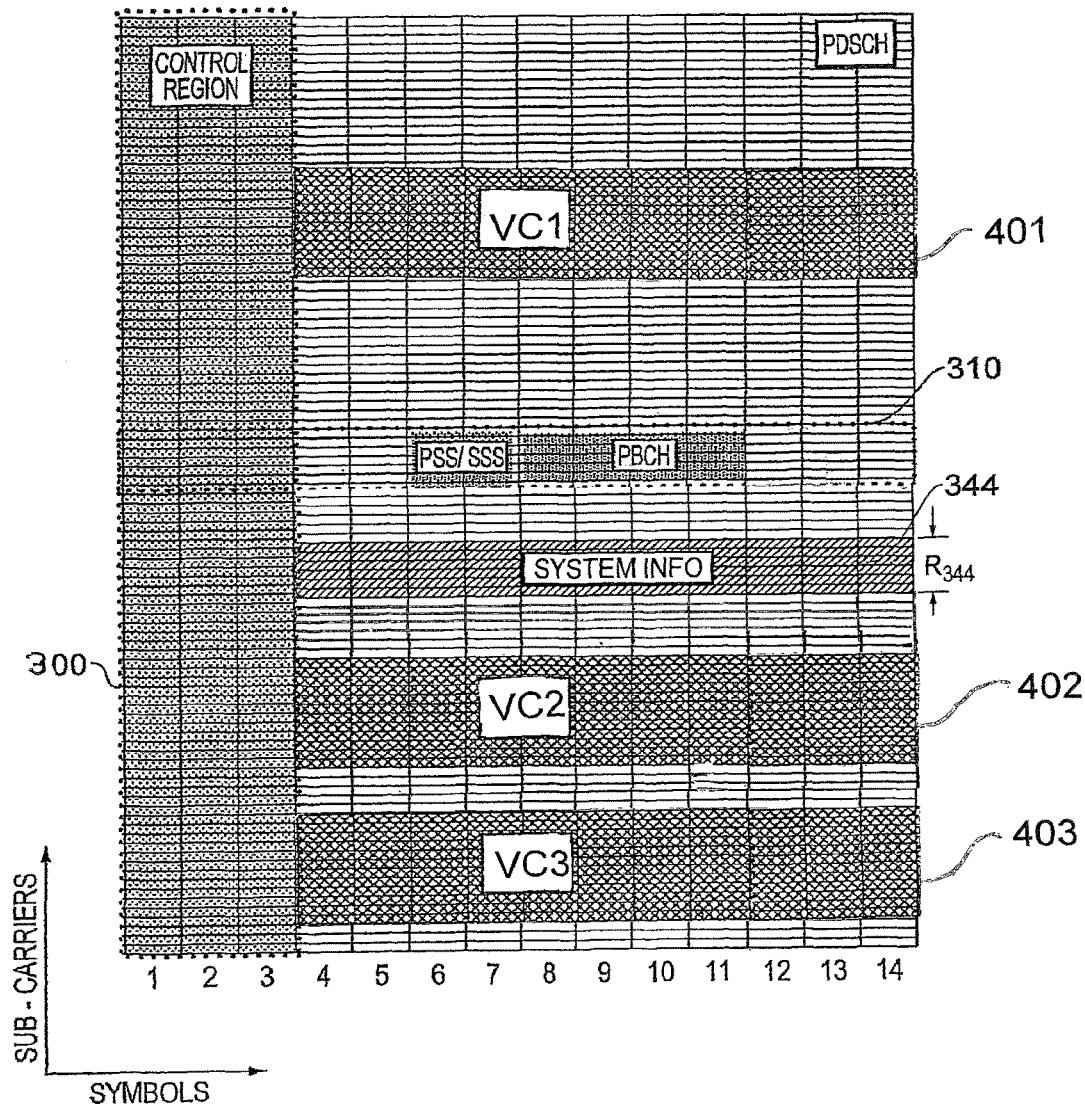
FIG. 4 schematically represents some aspects of a LTE downlink radio subframe structure associated with a host carrier supporting three virtual carriers.

FIG. 4 is a diagram which is similar to and will in many respect be understood from FIG. 3. However, FIG. 4 differs from FIG. 3 in schematically representing a downlink radio subframe corresponding to a host carrier in which a plurality (in this case three) virtual carriers 401, 402, 403 (VCs) are supported. The virtual carriers are labelled as VC1, VC2 and VC3 for ease of reference, as schematically indicated in FIG. 4. The general operation of the virtual carriers represented in FIG. 4 may be in accordance with previously-proposed schemes, for example as described in any of the above-identified documents [2] to [11]. Each virtual carrier thus represents a restricted subset of downlink transmission resources within the overall transmission resource grid associated with the host carrier which may be used for communicating at least some information with certain types of terminal devices, for example, reduced capability machine type communication terminal devices.

Thus, a conventional (i.e. non-reduced capability) terminal device may be supported using the full bandwidth of the resource grid represented in FIG. 4 in accordance with conventional LTE techniques. Downlink communications for a reduced capability terminal device, on the other hand, may be restricted to transmission resources within one of the virtual carriers to which the terminal device has been allocated.

In some cases the entirety of the downlink communications for the reduced-capability terminal device (i.e. including control signalling and higher layer/user-plane data) may be conveyed within the transmission resources of one of the virtual carriers, for example in accordance with the principles proposed in the above identified documents [2] to [9]. This may be appropriate, for example, for a terminal device which cannot receive the full bandwidth of the host carrier (and hence cannot receive the entirety of the control region 300).

In other cases the reduced capability terminal device may be able to receive the full-bandwidth of the host carrier (and hence receive and decode the control region 300), but may be restricted as to its ability to buffer and decodes the entirety of the PDSCH region, and so may buffer and decode only a subset of the downlink transmission resources spanning the virtual carrier to which the terminal device has been allocated, for example in accordance with the "T-shaped allocation" principles proposed in the above identified documents [10] and [11].

However, regardless of the specific manner of virtual carrier operation to be employed in a given implementation, a terminal device to be supported using a virtual carrier needs to establish which particular restricted frequency range is being used for the virtual carrier to which it has been allocated. For example, a reduced-capability terminal device which is to be supported using virtual carrier operation in the context of the downlink subframe transmission resource grid represented in FIG. 4 must establish whether it is to be supported on virtual carrier VC1, VC2 or VC3. As discussed above, one approach would be for the base station to inform the reduced-capability terminal device of the virtual carrier to which it has been allocated through dedicated signalling exchange during a connection procedure. However, again as noted above, this can give rise to increased signalling complexity and increased control signalling overhead.

Figure 5:
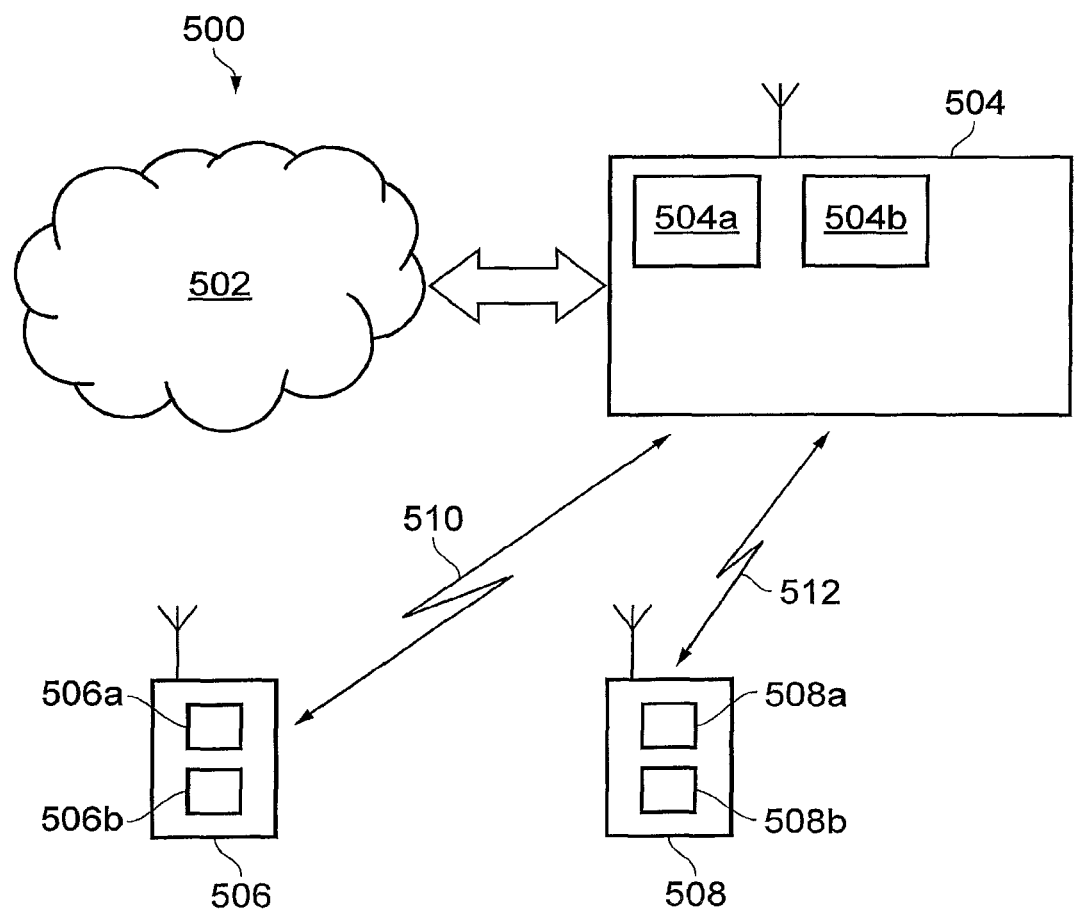
FIG. 5 schematically represents an adapted LTE-type wireless telecommunications system arranged in accordance with an example of the present disclosure.

FIG. 5 schematically shows a telecommunications system 500 according to an embodiment of the present disclosure. The telecommunications system 500 in this example is based broadly around an LTE-type architecture which supports a plurality of virtual carriers such as schematically represented in FIG. 4. Many aspects of the operation of the telecommunications system 500 are known and understood and are not described here in detail in the interest of brevity. Operational aspects of the telecommunications system 500 which are not specifically described herein may be implemented in accordance with any known techniques, for example according to the current LTE-standards with modifications as appropriate to incorporate virtual carrier operation, such as disclosed in GB 2 487 906 [2], GB 2 487 908 [3], GB 2 487 780 [4], GB 2 488 513 [5], GB 2 487 757 [6], GB 2 487 909 [7], GB 2 487 907 [8], GB 2 487 782 [9], GB 2 497 743 [10] and GB 2 497 742 [12], the entire contents of which are incorporated herein by reference.

The telecommunications system 500 comprises a core network part (evolved packet core) 502 coupled to a radio network part. The radio network part comprises a base station (evolved-nodeB) 504 coupled to a plurality of terminal devices. In this example, two terminal devices are shown, namely a first terminal device 506 and a second terminal device 508. It will of course be appreciated that in practice the radio network part may comprise a plurality of base stations serving a larger number of terminal devices across various communication cells. However, only a single base station and two terminal devices are shown in FIG. 5 in the interests of simplicity.

As with a conventional mobile radio network, the terminal devices 506, 508 are arranged to communicate data to and from the base station (transceiver station) 504. The base station is in turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service, EPS, connections with the terminal devices 506, 508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 5 may be broadly conventional, for example in accordance with established telecoms standards and the principles set out in the referenced documents mentioned herein, apart from where modified to provide functionality in accordance with embodiments of the present disclosure as discussed herein.

In this example, it is assumed the first terminal device 506 is a conventional smartphone type terminal device communicating with the base station 504 in a conventional manner. This conventional terminal device 506 comprises a transceiver unit 506a for transmission and reception of wireless signals and a processor unit 506b configured to control the device 506. The processor unit 506b may comprise a processor unit which is suitably configured/programmed to provide the desired functionality using conventional programming/configuration techniques for equipment in wireless telecommunications systems. The transceiver unit 506a and the processor unit 506b are schematically shown in FIG. 5 as separate elements. However, it will be appreciated that the functionality of these units can be provided in various different ways, for example using a single suitably programmed general purpose computer, or suitably configured application-specific integrated circuit(s)/circuitry. As will be appreciated the conventional terminal device 506 will in general comprise various other elements associated with its operating functionality.

In this example, it is assumed the second terminal device 508 is a machine-type communication (MTC) terminal device 504 adapted to operate in a virtual carrier (VC) mode in accordance with embodiments of the present disclosure when communicating with the base station 504. As discussed above, machine-type communication terminal devices can in some cases be typically characterised as semi-autonomous or autonomous wireless communication devices communicating small amounts of data. Examples include so-called smart meters which, for example, may be located in a customers house and periodically transmit information back to a central MTC server data relating to the customers consumption of a utility such as gas, water, electricity and so on. MTC devices may in some respects be seen as devices which can be supported by relatively low bandwidth communication channels having relatively low quality of service (QoS), for example in terms of latency. It is assumed here the MTC terminal device 508 in FIG. 5 is such a device.

The MTC device 508 comprises a transceiver unit 508a for transmission and reception of wireless signals and a processor unit 508b configured to control the MTC device 508. The processor unit 508b may comprise various sub-units, for example a VC selection unit, for providing functionality in accordance with some embodiments of the present disclosure as explained further herein. These sub-units may be implemented as discrete hardware elements or as appropriately configured functions of the processor unit. Thus the processor unit 508b may comprise a processor which is suitably configured/programmed to provide the desired functionality described herein using conventional programming/configuration techniques for equipment in wireless telecommunications systems. The transceiver unit 508a and the processor unit 508b are schematically shown in FIG. 5 as separate elements for ease of representation. However, it will be appreciated that the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the MTC device 508 will in general comprise various other elements associated with its operating functionality in accordance with established wireless telecommunications techniques.

The base station 504 comprises a transceiver unit 504a for transmission and reception of wireless signals and a processor unit 504b configured to control the base station 504 to operate in accordance with embodiments of the present disclosure as described herein. The processor unit 506b may again comprise various sub-units, such as a VC selecting unit and scheduling unit, for providing functionality in accordance with embodiments of the present disclosure as explained further below. These sub-units may be implemented as discrete hardware elements or as appropriately configured functions of the processor unit. Thus, the processor unit 504b may comprise a processor which is suitably configured/programmed to provide the desired functionality described herein using conventional programming/configuration techniques for equipment in wireless telecommunications systems. The transceiver unit 504a and the processor unit 504b are schematically shown in FIG. 5 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 504 will in general comprise various other elements associated with its operating functionality in accordance with established wireless telecommunications techniques.

Thus, the base station 504 is configured to communicate data with both the conventional terminal device 506 and the terminal device 508 according to an embodiment of the disclosure over respective communication links 510, 512. The communication link 510 for communications between the base station 504 and the conventional terminal device 506 is supported by a host carrier (e.g. potentially making use of the full range of transmission resources schematically represented in FIG. 4). The communication link 512 for communications between the base station 504 and the reduced-capability MTC terminal device 508 is supported by a virtual carrier (e.g. making use of resources within a selected one of the virtual carriers schematically represented in FIG. 4). Once the MTC terminal device 508 and the base station 504 have established/agreed what virtual carrier frequencies are to be used for supporting communications with the MTC terminal device 508 (i.e. selecting a virtual carrier on which the machine type communication terminal device 508 is to be supported) in accordance with embodiments of the present disclosure, subsequent data communication between the base station 504 and the MTC terminal device 508 may operate on the selected virtual carrier generally in accordance with any of the previously-proposed schemes for virtual carrier operation. For example, the MTC terminal device 508 may operate such that all control-plane and user-plane signalling from the base station 504 which is addressed to the terminal device 508 is made within the virtual carrier bandwidth. Alternatively, control-plane signalling from the base station 504 which is addressed to the terminal device 508 may be made within the full-bandwidth of the control region 300 represented in FIG. 4, with higher-layer data (user-plane data) being communicated within the restricted bandwidth of the selected virtual carrier.

Figure 6:
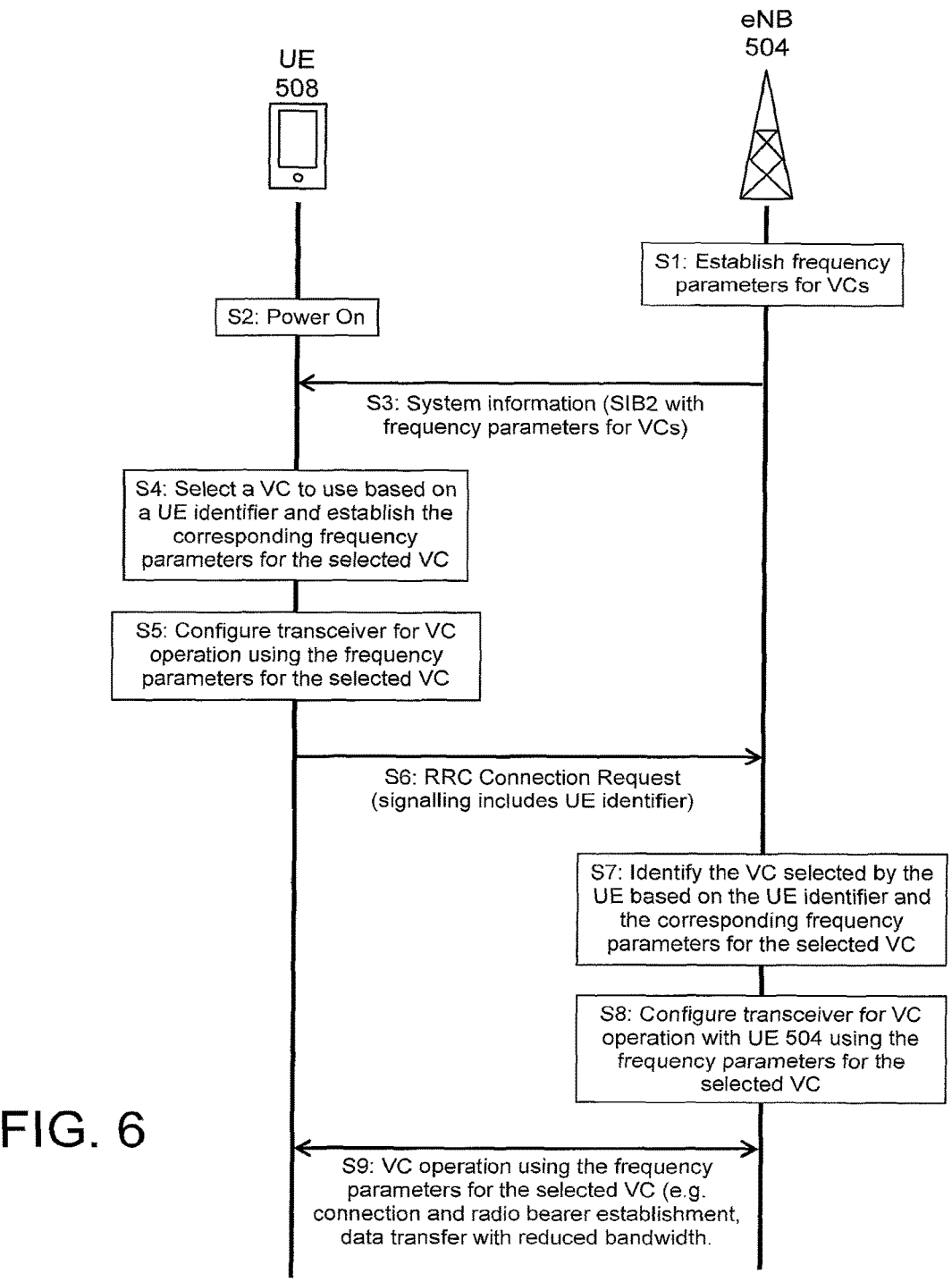
FIG. 6 is a signalling ladder-diagram schematically representing methods of operation in accordance with certain examples of the present disclosure.

FIG. 6 is a signalling ladder diagram schematically representing modes of operation for the terminal device 508 and the base station 504 schematically presented in FIG. 5 in accordance with some embodiments of the present disclosure. The modes of operation represented in FIG. 6 are configured to allow the terminal device 508 and the base station 504 to in effect independently select which of a plurality of available virtual carriers currently supported by the base station is to be used for downlink communications from the base station to the terminal device 508 in a virtual carrier mode.

Thus, in a first Step S1 represented in FIG. 6 the base station 504 establishes configuration parameters for a plurality of virtual carriers it is to support. The configuration parameters for the virtual carriers may comprise, for example, an indication of the number of virtual carriers and/or their frequencies. It will be appreciated there are many different ways in which configuration information relating to the frequencies of the virtual carriers can be characterised in different implementations. For example, the frequency locations associated with a particular virtual carrier (restricted frequency band) may be represented by an indication of a centre frequency and a bandwidth, or by upper and lower bounding frequencies. In an implementation where the bandwidths of the virtual carriers are fixed/predefined, for example at 1.4 MHz, the configuration information relating to the frequencies of the virtual carriers may comprise a single frequency value indicating the location of the virtual carrier in the frequency space of the host carrier (for example a centre frequency, or a lower or upper frequency indicating whether the virtual carrier is located).

In this example implementation it is assumed the base station has a wide degree of flexibility in scheduling resources to be used for supporting the virtual carrier operations. Thus, the base station may be configured to choose the number of virtual carriers to be implemented and the frequencies at which the virtual carriers will be located (and potentially in some examples their respective bandwidths) based on current traffic conditions. For example, if current traffic conditions indicate the base station is required to support a large number of reduced capability terminal devices, a higher number of virtual carriers may be configured for use than if the current traffic conditions indicate the base station is required to support a smaller number of reduced capability terminal devices. It is further assumed the base station 504 in this particular example implementation has flexibility in determining the frequency locations for the virtual carriers that are to be used. The base station may make this determination in accordance with conventional techniques. For example taking account of channel conditions at different frequencies. In other example implementations the base station may, for example, be able to choose the number of virtual carriers to implement, but the frequencies at which the virtual carriers are to be located may be predefined within the telecommunications system. For example, predefined frequency locations may be standardised for different numbers of virtual carriers.

For the sake of a concrete example, it is assumed here that in Step S1 the base station 504 determines that it is to support three virtual carrier at frequency locations as schematically represented by VC1, VC2 and VC3 in FIG. 4. Step S1 may be repeated on an on-going basis to allow the base station to continually optimise the selected number and frequencies of virtual carriers in accordance with changing traffic conditions. Alternatively, the frequency parameters established for the virtual carriers which are to be supported by the base station may be relatively static. In some examples the virtual carrier configuration parameters for a base station may be fixed. For example, the parameters may be established and fixed during initial deployment of the base station (for example, the relevant configuration parameters may be predefined for the wireless telecommunications system).

In Step S2 the MTC terminal device 508 seeks initial access to the radio network associated with the base station 504, for example in response to the terminal device 508 being powered on. Once powered on the terminal device 508 in this example initiates a conventional LTE-type network camp-on procedure to acquire the parameters needed to access the radio network. Thus, in accordance with broadly conventional techniques, the terminal device 508 synchronises with the base station's radio frame structure and decodes PBCH, PCFICH, and so forth, so the terminal device 508 is in a position to be able to acquire system information (SI) using known techniques (i.e. in accordance with previously-proposed reduced-capability terminal device camp-on procedures in networks supporting virtual carrier operation).

Thus as schematically represented in Step S3 of FIG. 6, the base station 504 transmits system information (SI) on a BCCH (broadcast control channel) and this is received by the terminal device 508 as part of its usual camp-on procedures is in accordance with known techniques.

However, in accordance with certain embodiments of the present disclosure, the system information broadcast by the base station 504 differs from conventional system information broadcast in an LTE-type network in that the system information includes additional information on the frequency parameters for the virtual carriers supported by the base station (as established in Step S1).

In this particular LTE-based example it is assumed this information is conveyed using newly-defined parameters conveyed in otherwise conventional system information block 2 (SIB2) signalling. For example, one or more new information elements may be used to convey the relevant configuration parameters. As noted above, there are various different ways in which the parameters may be characterised for the respective virtual carriers, for example in terms of a centre frequency and bandwidth, upper and lower bounding frequencies, a single frequency location with an assumed (i.e. fixed) bandwidth, and so forth. Furthermore, the information to be conveyed can be characterised in various ways. For example in terms of specific frequencies or in terms of index values identifying frequencies in accordance with a predefined association. Thus, the exact manner in which the information is conveyed to the terminal device may differ for different implementations. Where an indication of frequency is provided for each virtual carrier supported by the base station, the total number of virtual carriers can be determined from the amount of frequency information provided and so might not be separately conveyed in the system information.

Thus, on receiving the system information, in particular SIB2 (system information block 2) in this particular LTE-based example, in Step S3 of FIG. 6, the terminal device 508 is made aware of relevant configuration parameters for the virtual carriers supported by the base station. In particular, the terminal device in this example is informed of the number of virtual carriers being supported, $N_{VC}$, and their respective frequency locations, $F1, F2, \ldots FN_{VC}$, through the system information signalling received from the base station. For example, with reference to this example implementation as schematically represented in FIG. 4, the system information transmitted by the base station is adapted in accordance with an embodiment of the present disclosure to indicate the base station is currently supporting three virtual carriers (i.e. $N_{VC}=3$) at centre frequencies F1 (for VC1), F2 (for VC2) and F3 (for VC3). In this example implementation it is assumed the virtual carriers supported in the wireless telecommunications systems are all of a predefined fixed width in frequency space, such as 1.4 MHz, and so the system information provided from the base station does not need to provide any indication of the widths of the respective virtual carriers.

In Step S4 the terminal device 508 (more specifically the processor unit 508*b* of the terminal device) selects one of the available plurality of virtual carriers (restricted bandwidth carriers) supported by the base station as the virtual carrier on which it will assume it will be supported by the base station. The terminal device does this autonomously (i.e. without specific instruction from the base station) based on an identifier for the terminal device. In this example the identifier used by the terminal device for this purpose is the international mobile subscriber identity (IMSI) number associated with the device. The IMSI is a number permanently associated with the subscriber identity module (SIM) used by the terminal device. In Step S4 the terminal device thus makes a selection of one of the $N_{VC}$ virtual carriers supported by the base station in a way that depends on the identity of the terminal device.

In this specific example the terminal device 508 determines a remainder value obtained when dividing the identifier (IMSI) by the number of virtual carriers supported by the base station ($N_{VC}$) and uses this as an index value (IND) to select one of the available virtual carriers (VC1, VC2, VC3). That is to say the terminal device determines the value for IND according to the following equation:

$$IND = IMSI \bmod(N_{VC}). \quad \text{Equation 1}$$

Thus for this example in which the base station supports three virtual carriers (i.e. $N_{VC}=3$), Equation 1 provides a value for IND of 0, 1 or 2. This value is then used as an index to identify one of the available plurality of virtual carriers. For example, the virtual carriers may be considered as being arranged in order of decreasing frequency (or any other predefined order) and the terminal device may select one of them based on the value of IND. In particular, for an index value of IND the terminal device may select the virtual carrier associated with position (IND+1) in the list of available virtual carriers. I.e., if IND=0, the terminal device selects the first virtual carrier in the list (e.g. VC1); if IND=1, the terminal device selects the second virtual carrier in the list (e.g. VC2), and so on.

Thus, in Step S4 the processor unit 508*b* of the terminal device 508 autonomously selects one of the available virtual carriers (VC1, VC2, VC3) based on an identifier associated with the terminal device. Having chosen one of the virtual carriers, the terminal device can establish the corresponding frequency parameters for the virtual carrier, for example its centre frequency (e.g. based on configuration information received from the base station or from predefined associations for the wireless telecommunications system). In accordance with embodiments of the present disclosure the terminal device is adapted to assume subsequent communications from the base station will be received using the selected virtual carrier. Accordingly, in Step S5 the transceiver unit 508*a* of the terminal device 508 is appropriately configured to receive subsequent downlink communications from the base station on the selected virtual carrier. This aspect of the processing of FIG. 6 may be performed in accordance with conventional techniques for virtual carrier operations in wireless telecommunications systems once it has been established which virtual carrier frequencies are to be used by the terminal device.

Thus, following Step S5 in FIG. 6 the terminal device 508 has received information on what virtual carriers are being supported by the base station to which it wishes to attach, has selected one of the virtual carriers in which it expects to receive downlink UK is from the base station, and has configured its transceiver in readiness for receiving such communications. Significantly, this has been achieved without any dedicating signalling between the base station and the terminal device. Indeed, in accordance with the example method represented in FIG. 6, the terminal device has reached this stage without the base station even being aware that the terminal device is in the process of connecting to the base station.

In Step S6 represented in FIG. 6, the terminal device 508 continues its attachment procedure by transmitting a request to access the base station, which in this example based on an LTE-type architecture, is a conventional RRC (Radio Resource Control) Connection Request. In accordance with established techniques, the request for connection establishment includes an identifier for the terminal device, and in particular in this example includes an indication of the terminal device's IMSI. On receiving the connection request signalling in Step S6, the base station is configured to determine that the request is from a reduced capability terminal device implementing procedures in accordance with the principles described herein. This may be based, for example, on a device type classifier included in the connection request or based on a network-side lookup table linking the terminal device's IMSI with its status as a reduced capability terminal device implementing methods in accordance with embodiments of the present disclosure.

Having received the connection request from the terminal device in Step S6, the base station is made aware of the identifier used by the terminal device when determining the selected virtual carrier in Step S4 and can therefore independently determine which virtual carrier was selected by the terminal device. Thus, in Step S7 the base station 504 (in particular its processor unit 504*b*) identifies the virtual carrier selected by the terminal device using the terminal device identifier received in association with the connection request in Step S6 by applying Equation 1 in the same way as by the terminal device.

Thus, in Step S7 the processor unit 504*b* of the base station 504 independently determines the virtual carrier selected by the terminal device based on the identifier received from the terminal device in association with connection setup signalling. Having selected one of the virtual carriers, the base station can establish the corresponding frequency parameters for the virtual carrier, for example its centre frequency. In accordance with embodiments of the present disclosure the base station is adapted to assume subsequent downlink communications for the terminal device should be made using the selected virtual carrier (i.e. the selected virtual carrier is the one on which the terminal device is to be allocated downlink resources).

Accordingly, in Step S8 the transceiver unit 504*a* of the base station 504 is appropriately configured to transmit downlink communications to the terminal device on the selected virtual carrier (in practice this configuration may simply involve a scheduling unit of the base station storing an indication of what virtual carrier should be used for scheduling subsequent communications with the terminal device). This aspect of the processing of FIG. 6 may be performed in accordance with conventional techniques for virtual carrier operations in wireless telecommunications systems once in which it has been established which virtual carrier is to be used for a given terminal device (i.e. once a terminal device has been allocated to a virtual carrier).

Thus, following Step S8 in FIG. 6, both the terminal device 508 and the base station 504 have independently determined a selected one of the available plurality of virtual carriers which is to be used for subsequent downlink communications between the base station 504 and the terminal device 508. Significantly, this has been achieved without any additional dedicated signalling being exchanged between the base station and the terminal device.

Once the terminal device 508 and the base station 504 have independently established/selected the virtual carrier which is to be used in accordance with embodiments of the present disclosure, subsequent operations in the wireless telecommunications system may be made in accordance with conventional virtual carrier techniques. Thus, as schematically represented in Step S9 in FIG. 6, subsequent communications between the base station 504 and the terminal device 508 may proceed in accordance with conventional techniques for virtual carrier/restricted bandwidth operation.

The subsequent virtual carrier operation may follow any of the previously proposed techniques. For example, the VC operation represented in Step S9 may follow an approach such as described in reference documents [2] to [9] in which downlink communications received by the terminal device within the selected virtual carrier (restricted frequency band) comprise both user-plane data and control-plane data, wherein the control-plane data comprise indications of resource allocations for user-plane data for the terminal device on the virtual carrier. In other examples the VC operation represented in Step S9 may follow a "T-shape allocation" approach, such as described in reference documents [10] and [11] in which downlink communications received by the terminal device within the selected virtual carrier comprise user-plane data while control-plane data comprising indications of resource allocations for user-plane data on the virtual carrier are received with communications spanning frequencies outside the selected virtual carrier (e.g. in a control region spanning the system frequency bandwidth). Other modes of virtual carrier operation could equally be employed.

Thus, in accordance with certain embodiments of the present disclosure as schematically represented in FIG. 6, a reduced-capability terminal device 508 and a base station 504 may in effect come to an agreement as to the frequency characteristics of a virtual carrier is to be used for downlink communications without requiring any dedicated signalling to be exchanged between them beyond that normally exchanged in a wireless telecommunications system.

It will be appreciated these methods of operation for the terminal device 508 and the base station 504 are merely some example implementations in accordance with certain embodiments of the present disclosure. Variations and modifications to the approaches discussed above and represented in FIG. 6 can be adopted in accordance with other example implementations of certain embodiments of the present disclosure.

For example, it will be appreciated that in some example implementations, steps corresponding to those represented in FIG. 6 may be performed in a different order. For example, the steps of a terminal device selecting a virtual carrier from a plurality of available virtual carriers (Step S4 in FIG. 6) and configuring its transceiver appropriately (Step S5 in FIG. 6) could equally be performed after the step of the terminal device initiating the RRC connection request (Step S6 in FIG. 6).

It will also be appreciated that in some example implementations the configuration parameters for the virtual carriers may be predefined for the wireless telecommunications system. For example, it may be predetermined that the base station will support four virtual carriers at particular frequency locations. In this case the terminal device may be adapted to take account of this predefined information when selecting the virtual carrier to use based on its identity without needing to receive configuration parameters from the base station regarding the virtual carriers being supported. That is to say, in some implementations the system information communicated from the base station to the terminal device during the initial access procedure (such as schematically represented in Step S3 of FIG. 6) may be conventional without containing any information regarding configuration parameters for the virtual carriers. Instead the terminal device is simply preconfigured with the relevant information regarding the predefined configuration parameters to allow the selection of a virtual carrier in a step corresponding to Step S4 of FIG. 6 to be made.

In other examples the determination of the selected virtual carrier may be based on a different identifier for the terminal device. For example, rather than using the IMSI for the terminal device, a network-derived temporary identifier for the terminal device, such as a cell-radio network temporary identifier (C-RNTI) may be used. However, it will be appreciated this would require a degree of dedicated communication between the base station and the terminal device to be performed before a selected virtual carrier is agreed, for example in order for the base station to allocate the C-RNTI to the terminal device.

Furthermore, it will be appreciated in some examples the process of selecting a virtual carrier may be performed more than once. For example, a terminal device may initially select a virtual carrier in accordance with the principles described above when the terminal device is initially powered on. However, the base station may subsequently determine that a change in the need to support reduced capability devices (e.g. an increase or decrease in the number of reduced capability devices requiring virtual carrier support) should be met by changing the number of virtual carriers being supported. The base station may thus update the system information being broadcast to reflect a change in its virtual carrier configuration parameters. A terminal device recognising the update in system information may thus in effect repeat Steps S4 and S5 represented in FIG. 6, while the base station likewise in effect repeat steps corresponding to Step S7 and S8 represented in FIG. 6, thereby allowing continued VC operation on the newly-selected virtual carrier.

Thus there has been described a wireless telecommunications system in which downlink communications are made using a radio interface that spans a system frequency bandwidth (host carrier) and supports at least some communications from a base station to least some terminal devices within a plurality of restricted frequency bands (virtual carriers) which are narrower than and within the system frequency bandwidth. A terminal device conveys an indication of its identity, e.g. an IMSI, to the base station during an initial connection procedure as the terminal device seeks to access the radio interface. The terminal device and the base station both determine a selected restricted frequency band from among the plurality of restricted frequency bands based on the identity of the terminal device in the same way. Thus the terminal device and the base station select the same restricted frequency band and can accordingly configure their respective transceivers to allow for downlink communications between them within the selected restricted frequency band.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Some respective features of the present disclosure are defined by the following two groups of numbered paragraphs:

First Group of Numbered Paragraphs:

1. A method of operating a terminal device in a wireless telecommunications system in which downlink communications are made by a base station using a radio interface that spans a system frequency bandwidth and supports at least some communications with at least some terminal devices within a plurality of restricted frequency bands which are narrower than and within the system frequency bandwidth, the method comprising:
   selecting a restricted frequency band from among the plurality of restricted frequency bands based on an identifier for the terminal device; and
   configuring the terminal device to receive downlink communications from the base station within the selected restricted frequency band.

2. The method of clause 1, wherein the identifier for the terminal device comprises an International Mobile Subscriber Identity, IMSI, associated with the terminal device.

3. The method of clause 1 or 2, wherein the selected restricted frequency band is determined from a remainder value obtained when dividing a number associated with the identifier for the terminal device by the number of the plurality of restricted frequency bands supported by the base station.

4. The method of any of clauses 1 to 3, further comprising the terminal device establishing configuration information relating to the plurality of restricted frequency bands supported by the base station from system information received from the base station.

5. The method of clause 4, wherein the configuration information comprises an indication of the number of the plurality of restricted frequency bands supported by the base station and/or an indication of frequencies for the restricted frequency bands.

6. The method of any of clauses 1 to 5, further comprising the terminal device establishing configuration information relating to the plurality of restricted frequency bands supported by the base station from information received from the base station before or during an initial connection procedure for the terminal device on the radio interface.

7. The method of clause 6, wherein the configuration information comprises an indication of the number of the plurality of restricted frequency bands supported by the base station and/or an indication of frequencies for the restricted frequency bands.

8. The method of any of clauses 1 to 7, wherein configuration information relating to the plurality of restricted frequency bands supported by the base station is predefined for the wireless telecommunications system.

9. The method of clause 8, wherein the configuration information comprises an indication of the number of the plurality of restricted frequency bands supported by the base station and/or an indication of frequencies for the restricted frequency bands.

10. The method of any of clauses 1 to 9, wherein downlink communications received by the terminal device within the selected restricted frequency band comprise user-plane data and control-plane data, and wherein the control-plane data comprise an indication of resources within the selected restricted frequency band to be used for communicating the user-plane data 11. The method of any of clauses 1 to 10, wherein the downlink communications received by the terminal device within the selected restricted frequency band comprise user-plane data, and wherein the method further comprises the terminal device receiving control-plane data on frequency resources from across the system frequency bandwidth, wherein the control-plane data comprise an indication of resources within the selected restricted frequency band to be used for communicating the user-plane data.

12. The method of any of clauses 1 to 12, wherein the method further comprises conveying an indication of the identifier for the terminal device from the terminal device to the base station.

13. The method of clause 12, wherein the indication of the identifier for the terminal device is conveyed from the terminal device to the base station before or during an initial connection procedure for the terminal device on the radio interface.

14. The method of clause 12, wherein the indication of the identifier for the terminal device is conveyed in association with radio resource control, RRC, connection request signalling.

15. A terminal device for use in a wireless telecommunications system in which downlink communications are made by a base station using a radio interface that spans a system frequency bandwidth and supports at least some communications with at least some terminal devices within a plurality of restricted frequency bands which are narrower than and within the system frequency bandwidth, the terminal device comprising a processor unit and a transceiver unit, and wherein the processor unit is configured to select a restricted frequency band from among the plurality of restricted frequency bands based on an identifier for the terminal device and to configure the transceiver unit to receive downlink communications from the base station within the selected restricted frequency band.

Second Group of Numbered Paragraphs:

1. A method of operating a base station in a wireless telecommunications system in which downlink communications are made by the base station using a radio interface that spans a system frequency bandwidth and supports at least some communications with at least some terminal devices within a plurality of restricted frequency bands which are narrower than and within the system frequency bandwidth, the method comprising:
   selecting a restricted frequency band to be used for downlink communications for a terminal device from among the plurality of restricted frequency bands based on an identifier for the terminal device; and
   transmitting downlink communications to the terminal device within the selected restricted frequency band.

2. The method of clause 1, wherein the identifier for the terminal device comprises an International Mobile Subscriber Identity, IMSI, associated with the terminal device.

3. The method of clause 1 or 2, wherein the selected restricted frequency band is determined from a remainder value obtained when dividing a number associated with the identifier for the terminal device by the number of the plurality of restricted frequency bands supported by the base station.

4. The method of any of clauses 1 to 3, further comprising conveying configuration information relating to the plurality of restricted frequency bands supported by the base station to the terminal device in system information transmitted by the base station.

5. The method of clause 4, wherein the configuration information comprises an indication of the number of the plurality of restricted frequency bands supported by the base station and/or an indication of frequencies for the restricted frequency bands.

6. The method of any of clauses 1 to 5, further comprising conveying configuration information relating to the plurality of restricted frequency bands supported by the base station to the terminal device before or during an initial connection procedure for the terminal device on the radio interface.

7. The method of clause 6, wherein the configuration information comprises an indication of the number of the plurality of restricted frequency bands supported by the base station and/or an indication of frequencies for the restricted frequency bands.

8. The method of any of clauses 1 to 7, wherein configuration information relating to the plurality of restricted frequency bands supported by the base station is predefined for the wireless telecommunications system.

9. The method of clause 8, wherein the configuration information comprises an indication of the number of the plurality of restricted frequency bands supported by the base station and/or an indication of frequencies for the restricted frequency bands.

10. The method of any of clauses 1 to 9, wherein downlink communications transmitted to the terminal device within the selected restricted frequency band comprise user-plane data and control-plane data, and wherein the control-plane data comprise an indication of resources within the selected restricted frequency band to be used for communicating the user-plane data 11. The method of any of clauses 1 to 10, wherein the downlink communications transmitted to the terminal device within the selected restricted frequency band comprise user-plane data, and wherein the method further comprises transmitting control-plane data to the terminal device on frequency resources from across the system frequency bandwidth, wherein the control-plane data comprise an indication of resources within the selected restricted frequency band to be used for communicating the user-plane data.

12. The method of any of clauses 1 to 11, wherein the method further comprises receiving an indication of the identifier for the terminal device from the terminal device.

13. The method of clause 12, wherein the indication of the identifier for the terminal device is received from the terminal device before or during an initial connection procedure for the terminal device on the radio interface.

14. The method of clause 12, wherein the indication of the identifier for the terminal device is received from the terminal device in association with radio resource control, RRC, connection request signalling.

15. A base station for use in a wireless telecommunications system in which downlink communications are made by the base station using a radio interface that spans a system frequency bandwidth and supports at least some communications with at least some terminal devices within a plurality of restricted frequency bands which are narrower than and within the system frequency bandwidth, the base station comprising a processor unit and a transceiver unit, and wherein the processor unit is configured to select a restricted frequency band to be used for downlink communications with a terminal device from among the plurality of restricted frequency bands based on an identifier for the terminal device; and to configure the transceiver unit to transmit downlink communications to the terminal device within the selected restricted frequency band.

REFERENCES

[1] ETSI TS 122 368 V10.530 (2011-07)/3GPP TS 22.368 version 10.5.0 Release 10)
[2] GB 2 487 906 (UK patent application GB 1101970.0)
[3] GB 2 487 908 (UK patent application GB 1101981.7)
[4] GB 2 487 780 (UK patent application GB 1101966.8)
[5] GB 2 488 513 (UK patent application GB 1101983.3)
[6] GB 2 487 757 (UK patent application GB 1101853.8)
[7] GB 2 487 909 (UK patent application GB 1101982.5)
[8] GB 2 487 907 (UK patent application GB 1101980.9)
[9] GB 2 487 782 (UK patent application GB 1101972.6)
[10] GB 2 497 743 (UK patent application GB 1121767.6)
[11] GB 2 497 742 (UK patent application GB 1121766.8)
[12] Holma H. and Toskala A, "*LTE for UMTS OFDMA and SC-FDMA based radio access*", John Wiley and Sons, 2009

What is claimed is:

1. A method of operating a terminal device in a wireless telecommunications system in which downlink communications are received using a radio interface that spans a system frequency bandwidth and supports at least some communications with at least some terminal devices within a plurality of restricted frequency bands which are narrower than and within the system frequency bandwidth, the method comprising:
    selecting a restricted frequency band from among the plurality of restricted frequency bands based on an identifier for the terminal device and a total number of restricted frequency bands; and
    configuring the terminal device to receive downlink communications within the selected restricted frequency band.

2. The method of claim 1, wherein
    the identifier for the terminal device comprises an International Mobile Subscriber Identity (IMSI) associated with the terminal device.

3. The method of claim 1, wherein
    the selected restricted frequency band is determined from a remainder value obtained when dividing a number associated with the identifier for the terminal device by the number of the plurality of restricted frequency bands supported by a wireless network.

4. The method of claim 1, further comprising:
    establishing configuration information relating to the plurality of restricted frequency bands supported by the wireless network from system information received from the wireless network.

5. The method of claim 4, wherein
    the configuration information comprises at least one of an indication of the number of the plurality of restricted frequency bands supported by the wireless network or an indication of frequencies for the restricted frequency bands.

6. The method of claim 1, further comprising:
establishing configuration information relating to the plurality of restricted frequency bands supported by a wireless network from information received from the wireless network before or during an initial connection procedure for the terminal device on the radio interface.

7. The method of claim 6, wherein
the configuration information comprises at least one of an indication of the number of the plurality of restricted frequency bands supported by the wireless network or an indication of frequencies for the restricted frequency bands.

8. The method of claim 1, wherein
configuration information relating to the plurality of restricted frequency bands supported by a wireless network is predefined for the wireless telecommunications system.

9. The method of claim 8, wherein
the configuration information comprises at least one of an indication of the number of the plurality of restricted frequency bands supported by the wireless network or an indication of frequencies for the restricted frequency bands.

10. The method of claim 1, wherein
downlink communications received by the terminal device within the selected restricted frequency band comprise user-plane data and control-plane data, and
the control-plane data comprise an indication of resources within the selected restricted frequency band to be used for communicating the user-plane data.

11. The method of claim 1, wherein
the downlink communications received by the terminal device within the selected restricted frequency band comprise user-plane data, and wherein the method further comprises the terminal device receiving control-plane data on frequency resources from across the system frequency bandwidth, wherein the control-plane data comprise an indication of resources within the selected restricted frequency band to be used for communicating the user-plane data.

12. The method of claim 1, further comprising:
conveying an indication of the identifier for the terminal device from the terminal device to a base station.

13. The method of claim 12, wherein
the indication of the identifier for the terminal device is conveyed from the terminal device to the base station before or during an initial connection procedure for the terminal device on the radio interface.

14. The method of claim 12, wherein
the indication of the identifier for the terminal device is conveyed in association with radio resource control, RRC, connection request signaling.

15. The method according to claim 1, wherein
the selecting of the restricted frequency band is performed independently of a base station of the wireless telecommunications system.

16. A terminal device for use in a wireless telecommunications system in which downlink communications are received using a radio interface that spans a system frequency bandwidth and supports at least some communications with at least some terminal devices within a plurality of restricted frequency bands which are narrower than and within the system frequency bandwidth, the terminal device comprising:
a transceiver; and
a processor configured to select a restricted frequency band from among the plurality of restricted frequency bands based on an identifier for the terminal device and a total number of restricted frequency bands, and to configure the transceiver to receive downlink communications within the selected restricted frequency band.

17. A terminal device for use in a wireless telecommunications system in which downlink communications are received using a radio interface that spans a system frequency bandwidth and supports at least some communications with at least some terminal devices within a plurality of restricted frequency bands which are narrower than and within the system frequency bandwidth, the terminal device comprising:
circuitry configured to
select a restricted frequency band from among the plurality of restricted frequency bands based on an identifier for the terminal device and a total number of restricted frequency bands; and
receive downlink communications within the selected restricted frequency band.

* * * * *